United States Patent [19]

Weckenbrock et al.

[11] Patent Number: 4,651,211
[45] Date of Patent: Mar. 17, 1987

[54] VIDEO SIGNAL MOTION DETECTING APPARATUS

[75] Inventors: Hermann J. Weckenbrock, Bordentown Township, Burlington County, N.J.; Barbara J. Roeder, Pt. Pleasant, Pa.; Robert F. Casey, Oradell, N.J.; Leopold A. Harwood, Bridgewater, N.J.; Werner F. Wedam, Lawrenceville, N.J.

[73] Assignee: RCA Corporation, Princeton, N.J.

[21] Appl. No.: 819,861

[22] Filed: Jan. 17, 1986

[51] Int. Cl.$^4$ .............................................. H04N 5/21
[52] U.S. Cl. ...................................... 358/166; 358/37; 358/105; 358/167
[58] Field of Search .................... 358/166, 167, 36, 37, 358/105, 136

[56] References Cited

U.S. PATENT DOCUMENTS

| | | | |
|---|---|---|---|
| 4,090,221 | 5/1978 | Connor | 358/166 |
| 4,240,106 | 12/1980 | Michael et al. | 358/36 |
| 4,249,210 | 2/1981 | Storey et al. | 358/167 |
| 4,275,418 | 6/1981 | Trump et al. | 358/167 |
| 4,291,333 | 9/1981 | Warnock et al. | 358/36 |
| 4,307,420 | 12/1981 | Ninomiya et al. | 358/136 |
| 4,352,126 | 9/1982 | Poncin et al. | 358/167 |
| 4,361,853 | 11/1982 | Remy et al. | 358/167 |
| 4,485,403 | 11/1984 | Illetschko | 358/167 |
| 4,498,099 | 2/1985 | Pritchard | 358/36 |
| 4,539,594 | 9/1985 | Illetschko | 358/167 |
| 4,546,378 | 10/1985 | Annegarn | 358/31 |
| 4,605,966 | 8/1986 | Collins | 358/167 |

FOREIGN PATENT DOCUMENTS

| | | |
|---|---|---|
| 60-27287 | 2/1985 | Japan . |
| 60-65696 | 4/1985 | Japan . |
| 60-65697 | 4/1985 | Japan . |
| 60-65681 | 4/1985 | Japan . |
| 60-57793 | 4/1985 | Japan . |

OTHER PUBLICATIONS

Detlef Teichner, "Quality Improvement by Adaptive Inter./Intraframe Processing in PAL TV Receivers", Presented ICCE (Chicago) 6/7/85.
Von Gert Bostelmann, "Ein Codec für Bildfernsprechsignale Mit Subjektiv Optimiertem Bewegungspetektor" *Frequenz* vol. 33, (1979) pp. 2–8.

*Primary Examiner*—Tommy P. Chin
*Attorney, Agent, or Firm*—E. M. Whitacre; P. J. Rasmussen; E. P. Herrmann

[57] ABSTRACT

A motion detector for detecting interimage motion represented by composite video signals analyses both the chrominance and luminance components for image motion. Interimage motion represented by the luminance component is determined from interimage signal differences. The interimage signal differences are separated into high and low frequency spectra corresponding to fine and coarse luminance image detail. Selected signal differences from the low frequency spectrum are summed and threshold detected to determine motion in the coarse image detail. The high frequency spectrum of the sample differences are applied to parallel summing circuits which sum different combinations of sample differences in order to discriminate motion signals from non-moving chrominance transitions. The detection signals from the high and low frequency motion detectors are combined to produce a luminance motion signal. Interimage motion represented by the chrominance component is detected by combining selected ones of interimage signal sums. The interimage signal sums are high pass filtered and applied to parallel combining elements which discriminate chrominance motion from vertical luminance transitions.

16 Claims, 6 Drawing Figures

VIDEO SIGNAL MOTION DETECTING APPARATUS

This invention relates to apparatus for detecting temporal changes in images represented by composite color video signals.

BACKGROUND OF THE INVENTION

Video signal processing circuitry such as field/frame comb filters, field/frame recursive filters or progressive scan generators for example, have been designed which significantly enhance the quality of images reproduced from video signals. These systems perform very well for images which contain no motion (either image object motion or camera panning). Conversely, when image motion does occur, such systems tend to introduce undesirable artifacts. Consequently, these memory based processing systems are designed to be motion adaptive, i.e. the systems are either altered or switched out of the signal processing path when image motion occurs.

In order to alter motion adaptive systems during occurrences of image motion it is necessary to detect such occurrences. Typical motion detectors known in the art of video signal processing compare corresponding video signals from successive field or frame intervals. The assumption is made that if the interfield/frame video signals differ by more than a predetermined value motion has occurred.

Because video signals emanate from varying sources, e.g. different broadcast stations, VCR's, they tend to have varying signal-to-noise ratios (SNR's). Differences in SNR's complicates designing motion detectors to discriminate between image motion and image noise. One approach to discriminating between noise and motion is to average a number of signal differences corresponding to pixels surrounding the picture point being examined. Noise being uncorrelated, will tend to cancel. Signal differences corresponding to image object motion for localized pixels tend to exhibit a degree of correlation and thus add constructively.

The signal differences that are averaged are selected to correspond to pixels that are symmetrically disposed horizontally, vertically or both about the pixel being examined. Some systems weight the signal differences being averaged so that the signal averages exhibit a low-pass response.

Motion detectors which examine field/frame differences to determine the occurrence of motion are designed to operate on component rather than composite video signals. The reason for this is that chrominance components of composite video signals do not have similar phase relationships from frame-to-frame. Inherent frame-to-frame chrominance differences will produce motion signals even for still images. In order to preclude false motion detection when successive frames of composite video signal are compared, the composite video signal is typically limited to the low frequency luminance spectrum before comparison.

Examining only the low frequency spectrum of interframe composite video signal differences for motion, tends not to be satisfactory. In this instance motion of fine image detail cannot be detected. As an example, movement of a person's hair will not be detected in the reproduced image regardless of the speed of motion. Failure to detect motion of fine detail will generally tend to result in a blurred image.

Motion detectors which do operate on composite video (a) separate the luminance and chrominance components, (b) align the phase of the corresponding frame-to-frame chrominance components, (c) recombine the phase altered chrominance component with the luminance component and (d) take the interframe difference of the composite and chrominance phase altered composite video signals. This approach to detecting motion in composite video signals is not satisfactory because luminance and chrominance components cannot be completely separated in the chrominance spectrum of the composite video signal. The unseparated or residual luminance component in the separated chrominance signal undergoes an alteration during the chrominance phase alignment process. When this altered high frequency luminance is recombined and the interframe signal differences are taken, signal differences may occur in the absence of motion resulting in false motion detection.

An object of the present invention is to detect motion in the full spectrum of composite video signal with a minimum of false detection signals due to noise and cross components.

SUMMARY OF THE INVENTION

The present invention comprises a detector for detecting motion in images represented by video signals. The detector includes apparatus for generating signal corresponding to the differences of similar pixels from successive image intervals of the video signal. A first signal combining circuit combines signal differences from a plurality of image points in the vicinity of the image point currently under examination for image motion. The plurality of image points are selected from the horizontal image line containing the image point under examination and from a preceding image line. A second signal combining circuit combines signal differences from a plurality of image points in the vicinity of the image point under examination, which plurality of image points are selected from the horizontal image line containing the image point under examination and from a succeeding image line. The combined signal differences from the first and second combining means are coupled to detection circuitry which generates a motion signal on the condition that both combined signal differences concurrently exceed a predetermined magnitude.

DETAILED DESCRIPTION

In the following description the assumption is made that the composite video signal applied to the motion detecting apparatus is in sampled data format. For convenience, the sample rate is selected to be four times the color subcarrier rate and phase locked to color burst, though other sample rates may be selected. In the diagrams, the elements are illustrated in functional terms which are applicable to both analog and digital signal processing environments since the invention may be practiced with either analog or digital circuits. All of the individual circuit elements, both digital and analog, are well known in the art of video signal processing, and, thus, will not be described in detail. Depending on the choice of processing circuitry it may be necessary to include compensating signal delay elements to temporally align signals in the different circuit paths, but one skilled in the art of circuit design will readily comprehend and include such delays.

Figure 1:
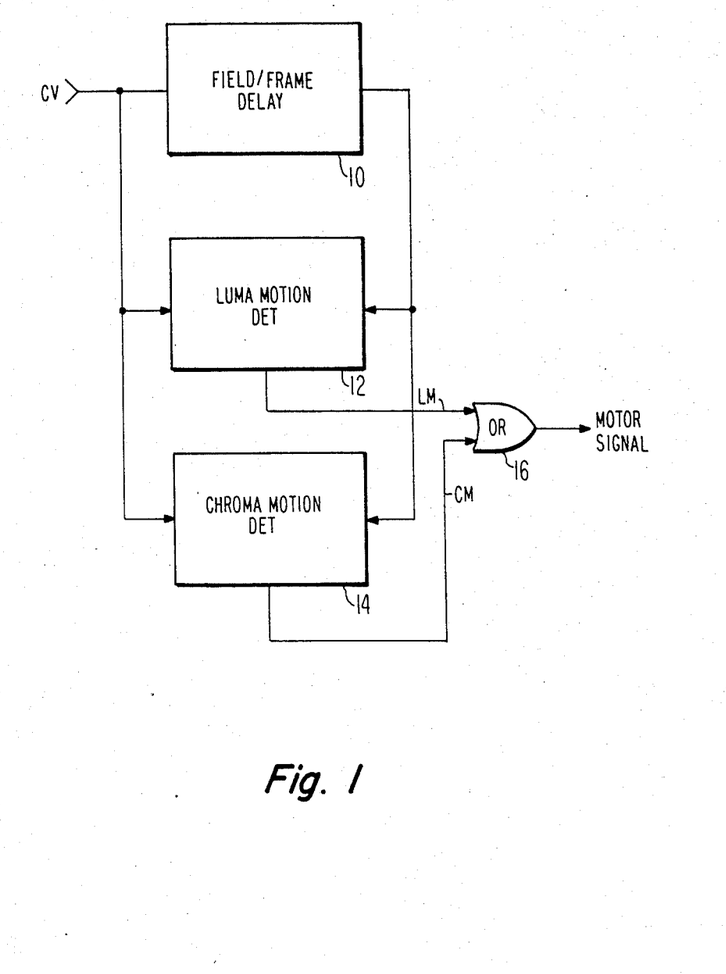
FIG. 1 is a block diagram of a motion detector including apparatus to detect motion in composite video signal.

Referring to FIG. 1, composite video (CV) signal which may be supplied from a television tuner in a TV receiver environment, from a color camera, or from the signal pickup circuitry in a VCR environment etc. is applied to delay element 10, a luminance motion detector 12 and a chrominance motion detector 14. Delayed signal from delay element 10 is coupled to respective second input connections of detectors 12 and 14. For NTSC composite video signals, delay element 10 will typically delay the applied signal CV by precisely one frame interval. For PAL composite video signal delay element 10 may delay the signal CV by two frame intervals.

Luminance motion detector 12 compares the current and delayed video luminance component of the composite video signals and generates a motion signal (LM) if a predetermined difference exits between the two luminance signals. Chrominance motion detector 14 compares the current and delayed chrominance components of the composite video signals and generates a motion signal (CM) if a predetermined difference exists between the two chrominance signals. The motion signals LM and CM from detectors 12 and 14 are coupled to respective inputs of an OR gate 16 which develops a motion signal when either the luminance or chrominance motion detectors generate a motion signal.

Figure 2:
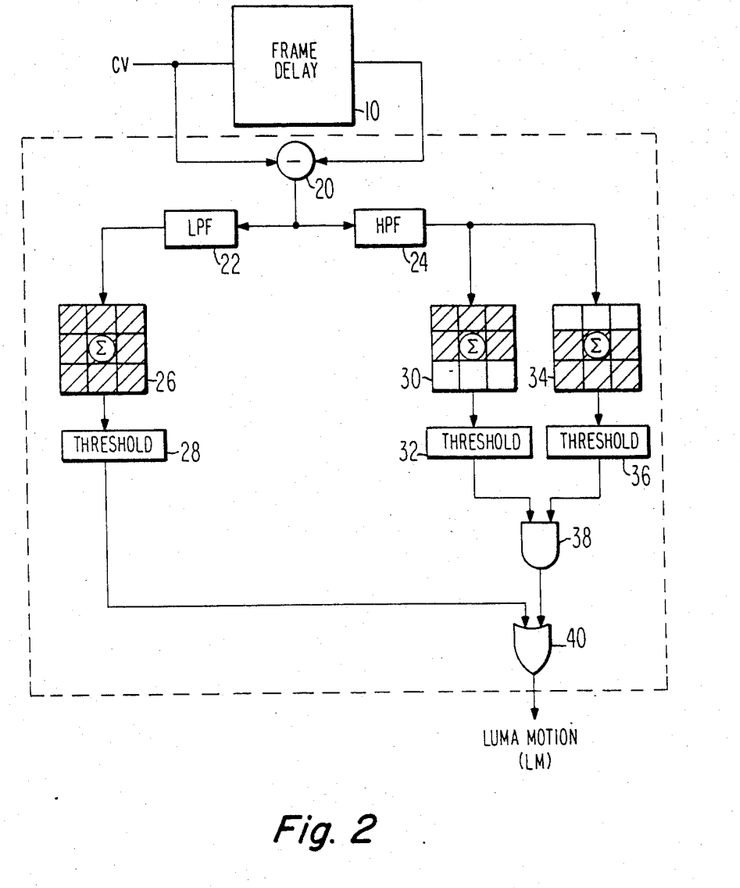
FIG. 2 is a partial block, partial schematic diagram of a detector for detecting motion represented by interimage changes in the luminance component of composite video signals.

FIG. 2 illustrates one embodiment of a luminance signal motion detector which may be implemented as motion detector 12 in FIG. 1. In FIG. 2 the current and delayed composite video signals are coupled to respective input terminals of the subtracter 20. Subtracter 20 develops frame difference samples which are coupled to the input terminals of a low-pass filter 22 and a high-pass filter 24. Low-pass filter 22 passes that portion of the composite video signal frequency spectrum not normally occupied by the chrominance component. Conversely, high-pass filter 24 (which may be a bandpass filter) passes that portion of the composite video signal spectrum which is normally occupied by the chrominance component.

The signal differences provided by low-pass filter 22 are coupled to a signal combining element 26. Combining element 26 sums a number of the frame difference samples. Element 26 is drawn as a matrix of three rows with three squares in each row. Each of the squares represents a signal difference sample. The central square corresponds to the image point or sample under examination for image motion. The square to the left and right of the central box correspond to sample differences occurring on the same horizontal image line. However, it is to be understood that these two sample differences need not correspond to the immediately preceding and succeeding sample differences in the stream of sample differences occurring at the four-times color subcarrier rate. The squares in the rows above and below the middle row correspond to sample differences from horizontal image lines occurring before and after the image line containing the pixel under examination. The cross hatching is intended to illustrate that each of the sample differences represented by the squares in the illustrative 3×3 matrix contribute to the sum generated by combining element 26.

The sum produced by element 26 is applied to a threshold detector 28. Threshold detector 28 provides a logic one output signal for the condition that the sum exceeds a predetermined magnitude and a logic zero otherwise. A digital embodiment of the threshold detector 28 may comprise the cascade connection of an absolute value circuit and an N-input OR gate. The absolute value circuit is configured to convert all sums to a single polarity signal. If the output signal of the absolute value circuit is a parallel N-bit signal, the M more significant bits are coupled to the M more significant input connection of the N-input OR gate. The N-M lesser significant bit connections of the OR gate are coupled to a logic zero signal. In such a configuration the OR gate will develop a logic one output signal for sums having magnitudes exceeding the values $(2^{N-M}-1)$.

The output signal of the threshold detector 28 is coupled to one input connection of the two-input OR gate 40.

The output signal from the high-pass filter 24 is coupled to two signal combining circuits 30 and 34. Combining circuit 30 combines sample differences from the horizontal image line containing the pixel under examination and a horizontal image line preceding the image line containing the pixel under examination. The central square in the illustrative matrix corresponds to the pixel under examination. The cross hatching indicates the samples that are combined by element 30. The samples that are combined from the two lines are vertically aligned relative to the displayed image. The preceding line is selected such that the vertically aligned samples have an antiphase color subcarrier relationship. For example, if the composite video signal is an NTSC signal the preceding line is the immediately preceding image line, or the third, fifth, etc. most immediate preceding line. The difference samples to the right and left of the difference sample corresponding to the pixel under examination need not be the difference samples immediately preceding and following the control difference ample.

The output of the combining element 30 is coupled to a threshold detector 32 which develops a logic one output signal for the condition that the combined difference samples exceed a predetermined magnitude and a logic zero otherwise. The output signal from threshold detector 32 is coupled to one input connection of a two input AND gate 38.

Combining element 34 is similar to combining element 30 except that it combines sample differences from the horizontal image line containing the difference sample corresponding to the pixel under examination with difference samples from a horizontal image line occurring later in time. The combined difference samples from combining element 34 are coupled to a threshold detector 36 which functions similarly to threshold detector 32. The output signal from threshold detector 36 is coupled to a second input connection of the AND gate 38.

AND gate 38 produces a logic one output signal only when both threshold detectors 32 and 36 concurrently produce logic one output signals. The output signal from AND gate 38 is coupled to a second input connection of OR gate 40. OR gate 40 produces a logic one output signal, indicating image motion, whenever threshold detector 28 or AND gate 38 output logic one signals.

In the FIG. 2 arrangement, elements 22, 26 and 28 detect image motion represented by luminance signal defining coarse image object detail. Elements 24, 30–38 detect image motion represented by luminance signal defining fine image object detail. For fine detail motion detection, parallel combining-circuit-threshold-detection circuits are incorporated to preclude false motion detection resulting from particular image chrominance transitions as will be explained with reference to FIG. 3.

The threshold values selected for threshold detectors 28, 32 and 36 may be fixed constants or made variable as a function of SNR as is known in the art of e.g. video signal recursive filters. Typically threshold detectors 32 and 36 will be designed to respond to like threshold values. Threshold detector 28 in general will require a dissimilar threshold value because (a) combining element 26 combines a larger number of difference samples than elements 30 and 34, and (b) the difference samples combined by element 26 contains less cross components than the difference samples combined by elements 30 and 34.

Figure 3:
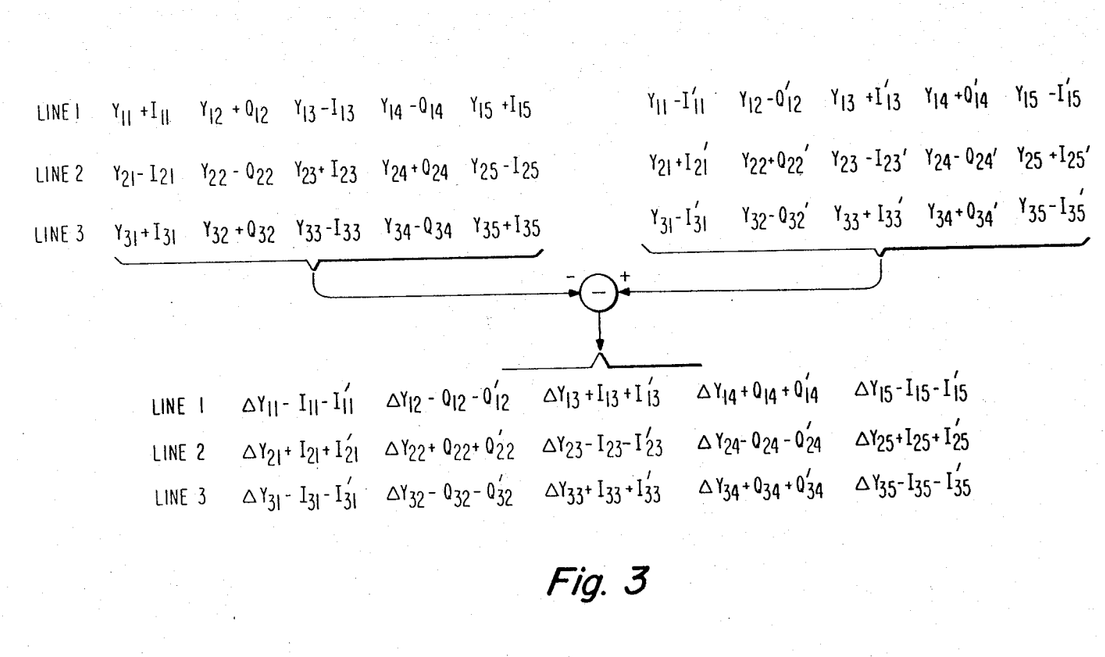
FIG. 3 is a chart of composite signal samples corresponding to portions of two frames of video information and the sample differences between the two frames of information.

Shown in FIG. 3 are corresponding samples from portions of three successive horizontal image lines of two successive frames of NTSC composite video. The samples occur in conformance to a four times subcarrier sampling rate phase locked to the subcarrier. $Y_{ij}$ values correspond to the luminance component. The $\pm I_{ij}$ and $\pm Q_{ij}$ values correspond to quadrature related chrominance components wherein the $\pm$ signs designate sampling phase and not necessarily sample polarity. In general successive I values along a horizontal line have substantially equal magnitude and are of opposite polarity. Similarly successive Q values have substantially equal magnitudes and are of opposite polarity. Due to the relatively high redundancy of video signal information vertically aligned samples from line-to-line represent like picture information.

The frame-to-frame sample differences, as developed by e.g. subtracter 20 in FIG. 2 are also illustrated. The $\Delta Y_{ij}$ terms represent the luminance differences and the $\pm(I_{ij}+I'_{ij})$ and $\pm(Q_{ij}+Q'_{ij})$ terms represent chrominance sample differences. In FIG. 2 the low-pass filter 22 attenuates the $\pm(I_{ij}+I'_{ij})$ and $\pm(Q_{ij}+Q'_{ij})$ terms so that combining circuit only operates on low frequency $\Delta Y_{ij}$ luminance differences. If no image changes occur between frames, the values $\Delta Y_{ij}$ will be zero except for noise contributions, i.e. electrical noise or quantization noise. Due to the random nature of noise, summing a number of the $\Delta Y_{ij}$ terms as in combing element 26 will tend to average the noise contribution to zero. Thresholding the sums in detector 28 is performed to add a further degree of noise immunity. Disregarding noise, if interframe image changes occur, a number of the $\Delta Y_{ij}$ samples will be non zero. This is so even for slight image changes because the signal is over sampled. Thus, summing a number of $\Delta Y_{ij}$ values in the vicinity of the pixel under examination will produce a larger motion signal than examining a single pixel difference sample. The SNR of the motion signal is therefore significantly enhanced.

The sample differences applied to combining elements 30 and 34 contain both high frequency luminance differences and chrominance information. Note that for NTSC signals, frame-to-frame chrominance components are antiphasal. Subtracting the interframe chrominance components has the effect of summing them as indicated in the matrix of difference sample values.

Due to the relatively high line-to-line redundancy of video images, and to the line-to-line antiphasal relationship of the chrominance component, summing vertically aligned difference samples from two adjacent lines will tend to cancel the chrominance components of the difference samples, leaving the high frequency luminance differences $\Delta Y_{ij}$.

Combining element 30 sums the difference samples from e.g. lines 1 and 2 shown in FIG. 3, and combining element 34 sums the difference samples from e.g. lines 2 and 3 shown in FIG. 3.

If the pixel under examination corresponds to a difference sample in line 2 either the sum from combining element 30 or 34 may indicate high frequency luminance motion. The parallel detectors (30–32) and (34–36) are incorporated to preclude false motion detection. Images occur wherein from line-to-line there may be a chrominance transition from one color to a different color or a transition from a colored image to a black and white image. For either of these conditions summing the line-to-line difference samples will not cancel the chrominance component resulting in a false detection. However, it is extremely unlikely that such a condition will concurrently occur between both the pair of lines 1 and 2 and the pair of lines 2 and 3. Therefore, if one, but not both, of detectors (30–32) and (34–36) generate a motion signal, one of these special image conditions, and not motion, is the cause. To preclude false detection, the two detectors are ANDED together. In effect detector (30–32) in conjunction with the AND gate 38 monitors detector (34–36) for such false motion detection and vice versa.

The effect of chrominance transitions causing false detection may be reduced further by judicious selection and weighting of the difference samples combined in elements 30 and 34. Let the difference samples be designated $S_{ij}$ where the indicies correspond to the indicies of the $\Delta Y_{ij}$ components in FIG. 3. Further, let the difference sample $S_{23}$ correspond to the pixel under examination. A combining element 30 which combines samples $S_{11}$, $S_{21}$, $S_{15}$, $S_{25}$ in a ratio of 1:2 with samples $S_{13}$ and $S_{23}$ will be significantly less sensitive to vertical chrominance transitions because the weighting tends to structure the combining circuitry to perform notch filtering at the chrominance subcarrier frequency. Combining element 34 will be similarly designed to sum the difference samples $S_{21}$, $S_{31}$, $S_{25}$, $S_{35}$ in the ratio of 1:2 with the difference samples $S_{23}$ and $S_{33}$.

Figure 4:
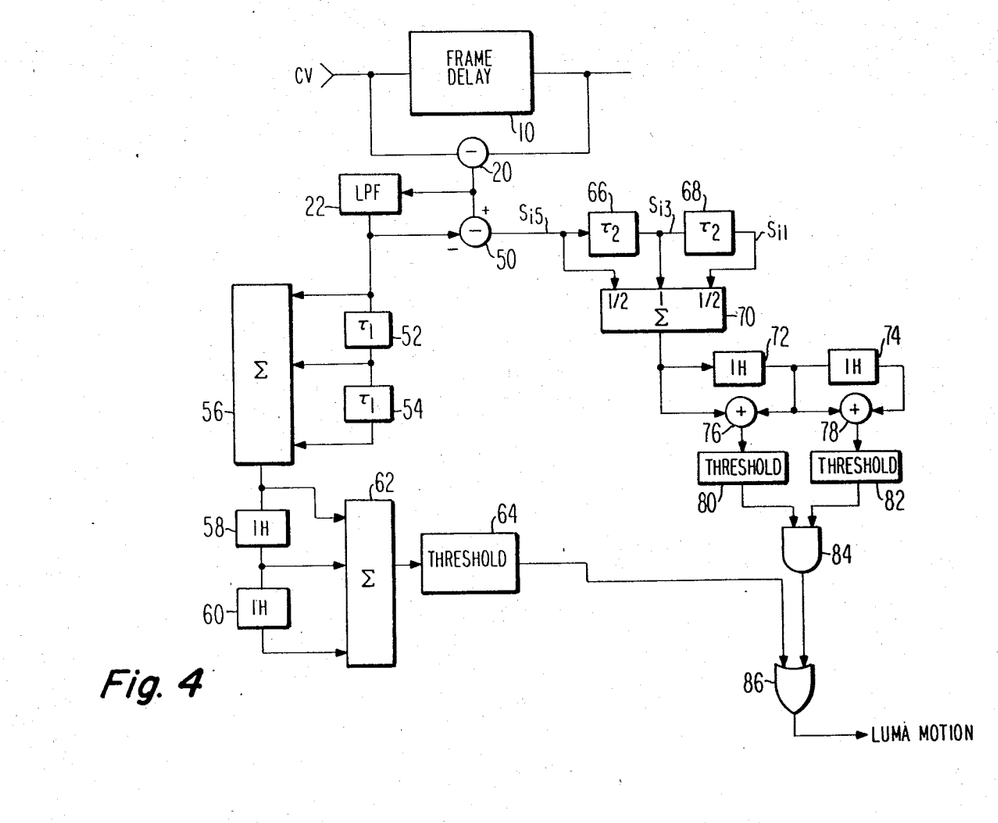
FIG. 4 is a partial block, partial schematic diagram of an embodiment of the FIG. 2 motion detector shown in greater detail.

FIG. 4 shows circuitry for realizing this latter embodiment. In FIG. 4 the low-pass filtered difference samples from filter 22 are coupled to two cascade connected delay elements 52 and 54 and to one input connection of a sample summing circuit 56. Delay elements 52 and 54 each provide a like delay interval of an integral number of sample periods e.g. one, two or three sample periods. Delayed difference samples from delay elements 52 and 54 are coupled to respective second and third input connections of summing circuit 56. Summing circuit 56 produces difference sample sums, S, of three difference samples from the same horizontal image line, which may be described by the equation $$S = S_{i1} + S_{i2} + S_{i3}. \qquad (1)$$

The difference sample sums from summing circuit 56 are coupled to the cascade connection of two one-horizontal-line delay elements 58 and 60. The output signals from summing circuit 56, delay element 58 and delay element 60 are coupled to respective input connections of summing circuit 62 and represent sample sums from three horizontal image lines. Summing circuit 62 produces a difference sample sum of three difference samples from each of three successive lines. This sample sum is coupled to the threshold detector 64 which corresponds to the threshold detector 28 in FIG. 2. The output signal from threshold detector 64 corresponds to a low frequency luminance motion signal and is coupled to an input connection of OR gate 86.

The difference samples from the subtracter 20 are coupled to the minuend input connection of subtracter 50 and the low-pass filtered difference samples from filter 22 are coupled to the subtrahend input connection of subtracter 50. The frequency spectrum exhibited by the signal output from subtracter 50 is complementary to the signal spectrum of the signal output from the low-pass filter 22. In other words the combination of subtracter 50 and low-pass filter 22 forms a high-pass filter with respect to the composite video signal spectrum.

High-pass filtered difference samples from subtracter 50 are coupled to the cascade connection of the two delay elements 66 and 68. In this particular embodiment delay elements 66 and 68 each provide signal delays of two sample periods. In consequence, delay elements 68 and 66 and the input of delay element 66, provide every second sample difference i.e. $S_{i1}$, $S_{i3}$ and $S_{i5}$. The output connection of subtracter 50, delay element 66 and delay element 68 are coupled to respective input connections of weighting and combining circuit 70. The outer difference samples $S_{i1}$ and $S_{i5}$ are weighted by one-half and summed with the difference sample $S_{i3}$, to form the weighted sum of three sample differences from one horizontal image line.

The weighted sums from weighting and combining circuit 70 are coupled to the cascade connection of the two one-horizontal-line delay elements 72 and 74. The input and output connections of delay element 72 are coupled to respective input connections of adder 76. Adder 76 produces difference sample sums which correspond to the sums produced by combining element 30 in FIG. 2. The input and output connections of delay element 74 are coupled to respective input connections of a further adder 78. Adder 78 produces difference sample sums corresponding to the output sums provided by combining element 34 of FIG. 2.

The output sums provided by adders 76 and 78 are coupled to threshold detectors 80 and 82 respectively. The output connections of threshold detectors 80 and 82 are coupled to respective input connections of the two-input AND gate 84, the output of which is coupled to the second input connection of OR gate 86.

In the circuitry of FIGS. 2 and 4 the full band signal differences may be applied directly to the high frequency detectors, i.e. (30–32) and (34–36), and the low frequency detector (26–28) omitted. The advantage of this arrangement is a reduction in hardware. The disadvantage is a small penalty in terms of motion/noise discrimination because the low frequency detector (26–28) exhibits a better motion/noise ratio due to the symmetry of differences selected.

Figure 5:
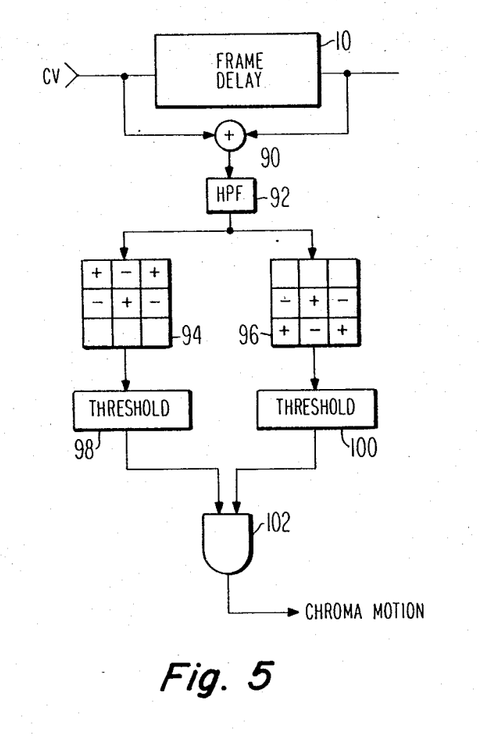
FIGS. 5 and 6 are a block diagram of a detector for detecting motion represented by interimage changes in the chrominance component of composite video signals and FIG. 6 is a more detailed schematic diagram of one embodiment of the detector illustrated in FIG. 5.

FIG. 5 illustrates a detector for detecting inter-image motion represented by the chrominance component of composite video signal and which may be used for the motion detector 14 in FIG. 1. In FIG. 5, current composite video signal samples and corresponding frame delayed composite video samples are coupled to respective input connections of an adder 90. If there are no inter-image changes, adder 90 will produce sample sums corresponding to $2Y_{ij}$. The chrominance components being antiphase from frame-to-frame cancel in the summing process. Conversely, if there is inter-image motion the sums output by adder 90 will correspond to $2Y_{ij} + \Delta Y_{ij} \pm \Delta I_{ij}$ or to $2Y_{ij} + \Delta Y_{ij} \pm \Delta Q_{ij}$, where $\Delta Y_{ij}$ is the image change represented by the luminance component and $\pm \Delta I_{ij}$ and $\pm \Delta Q_{ij}$ are image changes represented by the quadrature related chrominance components. The chrominance changes $\Delta I_{ij}$ and $\Delta Q_{ij}$ alternate in polarity at the subcarrier rate and thus are designated $\pm \Delta I$ and $\pm \Delta Q$. The changes $\Delta I_{ij}$ and $\Delta Q_{ij}$ will tend substantially to be antiphasal from line-to-line (NTSC) and antiphasal every two lines for PAL signals.

The sample sums produced by adder 90 are applied to a filter 92 which attenuates samples having frequencies outside the band of frequencies normally occupied by the chrominance component of composite video signal. The filtered sample sums are coupled to sample combing circuits 94 and 96.

Combining element 94 combines sample sums from the horizontal image line containing the sample sum representing the current pixel under examination and sample sums from a previously occurring horizontal image line. Combining element 96 combines sample sums from the horizontal image line containing the sample sum representing the pixel under examination and sample sums from a succeeding horizontal image line. All of the sample sums combined by either element 94 or 96 are in relatively close proximity to the sample sum representing the pixel under examination though not necessarily immediately adjacent. Combining elements 94 and 96 are represented by like matrixes of three rows of three squares per row.

Each row represents a portion of sample sums from one image line. Each square represents a sample sum. However, only the sample sums represented by a square containing a plus or a minus sign are included in combined samples produced by combining elements 94 and 96. In addition, the plus and minus signs designate the polarity with which each of the sample sums are combined. The sample sums of each vertically aligned pair of sums are combined with opposite polarity. Because of the high line-to-line redundancy of most images the luminance components in the vertically aligned sample sums will cancel. The polarity selection by which the sample sums are combined also tend to render the chrominance component differences to a single like polarity so that all non zero chrominance differences sum constructively to produce a motion signal with enhanced SNR.

The combined sample sums generated by combining circuits 94 and 96 are applied to respective threshold circuits 98 and 100. Threshold circuits 98 and 100 develop logic one output signals if the signal applied to its respective input connection exceeds a predetermined value and develop logic zeroes otherwise. The output connection of threshold circuits 98 and 100 are coupled to respective input connections of the two-input AND gate 102. AND gate 102 produces a logic one output signal, indicating image motion, only when both of the threshold circuits 98 and 100 concurrently produce logic one output signals.

The chrominance motion detector utilizes parallel detectors (94,98) and (96,100) to preclude false motion detection resulting from line-to-line or vertical luminance transitions which would defeat luminance cancellation in either one or the other of the combining circuits. It is very unlikely that such a luminance transition will occur between the two lines from which samples are combined by circuit 94 and concurrently between the two lines from which samples are combined by circuit 96. Thus, for line-to-line luminance transitions not due to image motion, only one of the detectors (94,98) or (96,100) will develop a motion signal, which is insufficient to condition AND gate 102 to produce a chrominance motion signal. However, it is certain that if motion occurs at pixels represented by the squares in the middle row of sample sums, which row contains the pixel under examination, both detectors 94 and 96 will simultaneously detect such occurrence. In this instance AND gate 102 will be conditioned to provide a chrominance motion signal.

Figure 6:
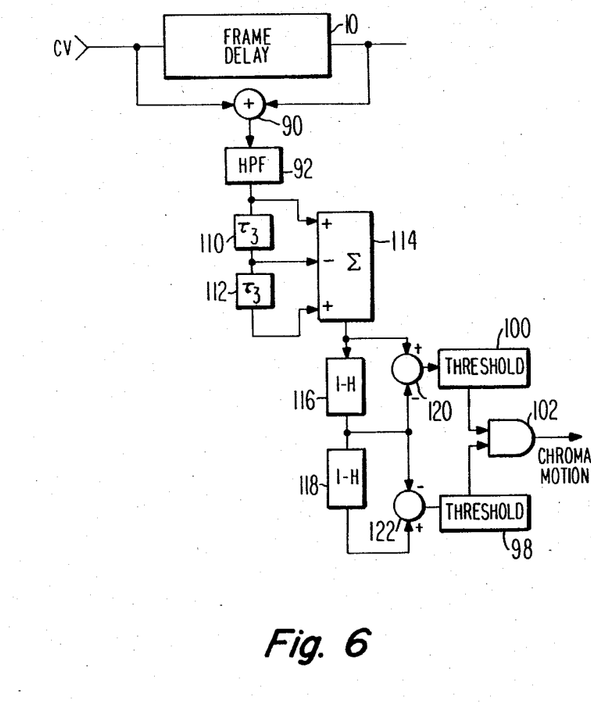

FIG. 6 shows one embodiment of the FIG. 5 motion detector in greater detail. In FIG. 6, elements designated with like numerals to those in FIG. 5 perform like functions.

In FIG. 6 the high-pass filtered sample sums from filter 92 are coupled to the cascade connection of two similar delay elements 110 and 112. Delay elements 110 and 112 each delay the sample sums by a small number of sample periods. It is advantageous that delay elements 110 and 112 be designed to delay samples by two sample periods to ensure more complete luminance cancellation. This result arises by virtue of including only one of the quadrature chrominance components (e.g. the $\Delta I_{ij}$ component) in the combined sample sums.

The sample sums from the filter 92 and the twice delayed sample sums from delay element 12 are coupled to non-inverting input connections of the summing circuit 114. The delayed sample sums from delay element 110 are coupled to an inverting input connection of summing circuit 114. Circuit 114 develops the sum of the sample sums applied to its non-inverting input connections and the negative of the sample sums applied to its inverting input connection, which sums correspond to the sums of sample sums along one horizontal image line. Note that the inverting and non-inverting inputs may be interchanged without altering the system function. In addition, more than three sample sums per horizontal line may be combined. Finally, the sample sums may be weighted as in the FIG. 4 circuitry.

The combined sums from the summing circuit 114 are coupled to the cascade connection of two one-horizontal-line delay elements 116 and 118. Delayed combined sums occurring at the output connections of delay element 118 correspond to the combination of sample sums from the top row of squares in the matrix of elements 94 and 96 in FIG. 5. The output connections of delay element 116 provides combined sums corresponding to the combination of sample sums represented by the middle row of squares in the matrix of elements 94 and 96 in FIG. 5, and the output connection of combining element 114 provides combined sums corresponding to the combination of sample sums represented by the bottom row of squares in the matrix elements 94 and 96.

The combined sums from the output connections of delay elements 116 and 118 are applied to the subtrahend and minuend input connections of subtracter 122 respectively. Substracter 122 combines the combined sums in accordance with the respective sample sum polarities indicated in the matrix of element 94. The output of subtracter 122 is threshold detected in threshold circuit 98, the output of which in coupled to one input connection of AND gate 102.

The combined sum from the output connections of combining element 114 and delay element 116 are coupled to the minuend and subtrahend input connections respectively of subtracter 120. Subtracter 120 combines the combined sums in accordance with the respective sample sum polarities indicated in the matrix of element 96 of FIG. 5. The combined sums produced by subtracter 120 are threshold detected in threshold circuit 100, the output of which is coupled to a second input connection of AND gate 102. AND gate 102 develops a chrominance motion signal on the condition that the combined sums from subtracters 120 and 122 concurrently exceed a predetermined threshold value.

In the foregoing embodiments the circuitry initially combines sample sums occurring in respective horizontal lines and then combines the combined samples from the respective horizontal lines. It will be appreciated by those skilled in the art of signal processing that sample sums from the different horizontal lines may be combined first, and then these combined sums combined horizontally. A further alternative embodiment may provide all of the sample sums and/or difference signals of the respective matrices simultaneously, which samples may then be combined in a tree arrangement of adders/subtractors.

The illustrative embodiments imply that the motion indicating output signals are single bit bilevel signals. It will be appreciated by those skilled in the art that the motion indicating signals may be multi-bit signals which may correspond, for example, to the average of the combined samples produced by the respective combining means, or the differences between the combined samples and the appropriate threshold values etc.

What is claimed is:

1. A detector for detecting interimage motion in images represented by composite video signal comprising:
   an input terminal for applying composite video signal;
   delay means, coupled to said input terminal, for providing replicas of said composite video signal delayed by an integral number, including one, of image periods;
   means coupled to said input terminal and said delay means for providing differences of said composite video signal and said delayed composite video signal;
   means, including means coupled to said means for providing differences, for passing to a first output terminal, differences having frequency components normally occupied by chrominance components of said composite video signal to the relative exclusion of other frequency components of said composite video signal;
   first combining means coupled to said first output terminal for combining a plurality of differences, including a difference corresponding to an image point (pixel) under examination for motion, said plurality of differences corresponding to image points occurring in a horizontal image line containing said image point under examination and a horizontal image line preceding said horizontal image line containing said image point under examination;

a first threshold detector, coupled to said first combining means, for producing a motion indicating signal when combined differences applied thereto exceed a predetermined magnitude;

a second combining means, coupled to said first output terminal, for combining a plurality of differences including a difference corresponding to said image point under examination, said plurality of differences corresponding to image points occurring in a horizontal image line containing said image point under examination and a horizontal image line following said horizontal image line containing said image point under examination;

a second threshold detector, coupled to said second combining means, for producing a motion indicating signal when combined differences applied thereto exceed a predetermined magnitude;

means, coupled to said first and second threshold detectors, for providing at a second output terminal, a motion indicating signal whenever the first and second threshold detectors concurrently produce motion indicating signals.

2. The detector set forth in claim 1 wherein the means including means further includes:

means, coupled to said means for providing differences, for passing to a third output terminal, differences having frequency components of said composite video signal not normally occurring in the frequency spectrum occupied by said chrominance component;

third combining means, coupled to said third output terminal, for combining a plurality of said differences, said plurality of differences corresponding to image points symmetrically disposed about said image point under examination;

a third threshold detector, coupled to said third combining means, for producing a motion indicating signal when combined differences applied thereto exceed a predetermined magnitude; and means coupled to said third threshold detector and said second output terminal for providing at a fourth output terminal a motion indicating signal whenever said third threshold detector or said second output terminal produce a motion indicating signal.

3. The detector set forth in claim 2 wherein said differences occur as sampled data differences and said third combining means comprises:

a cascade connection of;

(A) means for summing a plurality of sample differences corresponding to image points occurring in one horizontal image line; and (B) means for summing sample differences corresponding to image points occurring in successive horizontal image lines.

4. The detector set forth in claim 2 wherein said differences occur as sampled data differences and said first combining means includes:

first summing means coupled to said first output terminal for summing difference samples corresponding to image points occurring in the same horizontal image line; and second summing means coupled to said first summing means, for summing summed differences samples provided by said first summing means from two different horizontal image lines; and wherein said second combining means includes means coupled to said first summing means, for summing summed difference samples provided by said first summing means from two horizontal image lines one of which is different from the horizontal image lines summed by said second summing means.

5. The detector set forth in claim 1 wherein said differences occur as sampled data differences and said first combining means comprises;

first summing means coupled to said first output terminal for summing difference samples corresponding to image points occurring in the same horizontal image line; and second summing means coupled to said first summing means, for summing summed differences samples provided by said first summing means from two different horizontal image lines; and wherein said second combining means includes means coupled to said first summing means, for summing summed difference samples provided by said first summing means from two horizontal image lines on of which is different from the horizontal image lines summed by said second summing means.

6. The detector set forth in claim 1 further including:

means coupled to said input terminal and said delay means for providing sums of said composite video signal and said delayed composite video signal;

filter means, coupled to said means for providing sums, for passing frequency components of said sums normally occurring in the frequency band of composite video signal occupied by chrominance components;

third combining means, coupled to said filter means for combining a plurality, even in number, of said sums, said plurality of sums corresponding to image points occurring in a horizontal line containing said image point under examination and image points occurring in a horizontal image line preceding said horizontal image line containing said image point under examination, said third combining means combining alternate sums along a horizontal image line in opposite polarity and wherein one half of said plurality of sums are combined in a positive polarity sense and one half of said plurality of sums are combined in a negative polarity sense;

a third threshold detector, coupled to said third combining means, for producing a motion indicating signal whenever combined signals provided by said third combining means exceeds an predetermined magnitude;

fourth combining means, coupled to said filter means, for combining a plurality, even in number, of said sums, said plurality of sums corresponding to image points occurring in said horizontal line containing said image point under examination and image points occurring in a horizontal image line following said horizontal image line containing said image point under examination, said fourth combining means combining alternate sums along a horizontal image line in opposite polarity and wherein one half of said plurality of sums are combined in a positive polarity sense and one half of said polarity sum are combined in a negative polarity sense;
a fourth threshold detector, coupled to said fourth combining means, for producing a motion indicating signal whenever combined signals provided by said fourth combining means exceed a predetermined magnitude;
means coupled to said third and fourth threshold detectors for providing a chrominance motion indicating signal when said third and fourth threshold detectors concurrently provide motion indicating signals.

7. The detector set fourth in claim 6 wherein the means including means further includes means responsive to said chrominance motion indicating signal and said motion indicating signal provided by said second output terminal for providing a motion indicating signal on the occurrence of said chrominance motion indicating signal or said motion indicating signal provided at said second output terminal.

8. The detector set forth in claim 6 wherein said sums occur as sampled data sums and said third combining means includes:
a cascade connection of first and second delay elements coupled to said filter for providing delayed replicas of said sums, said first and second delay elements each providing like delays of an integral number of sample periods;
means coupled to said filter and said second delay element for combining said sum samples from said filter and twice delayed sum samples from said second delay element in opposite polarity sense with once delayed sum samples from said first delay element to produce horizontally combined sum samples;
a further delay means coupled to said means for producing horizontally combined sum samples, said further delay means for providing sample delays of one horizontal image line periods; and
a further combining means coupled to an input and an output of said further delay means for combining said horizontally combined sum samples in opposite polarity.

9. The detector set forth in claim 6 wherein said preceding horizontal image line is selected such that chrominance components therein have an antiphase relationship with chrominance components corresponding to said horizontal image line containing said image point under examination.

10. A composite signal interimage motion detector comprising:
a source of composite video signal;
means coupled to said source for developing interimage difference samples, of corresponding signals from two image periods, from frequency components of said composite video signal containing fine luminance image detail information;
first means, coupled to said means for developing difference samples, for combining a plurality of said difference samples, said plurality of difference samples including a difference sample corresponding to an image point currently under examination for interimage motion, and difference samples corresponding to image points proximate said image point under examination occurring in a horizontal image line containing said image point under examination and in a preceding horizontal image line to produce first combined difference samples;
second means, coupled to said means for developing difference samples, for combining a plurality of said difference samples, said plurality of difference samples including a difference sample corresponding to said image point under examination, and difference samples corresponding to image points proximate said image point under examination occurring in said horizontal image line containing said image point under examination and in a succeeding horizontal image line to produce a second combined difference samples;
means, coupled to said first and second combining means, for producing a fine detail luminance motion signal whenever said first and second combined difference samples concurrently exceed a predetermined magnitude value.

11. The interimage motion detector set forth in claim 10 further including:
means coupled to said source for producing interimage difference samples from frequency components of said composite video signal representing coarse luminance image detail information;
a third combining means coupled to said means for producing difference samples representing coarse luminance detail information, for combining a plurality of difference samples representing coarse luminance detail information to produce third combined difference samples, said plurality of difference samples representing coarse luminance detail information corresponding to image points proximate said image point under examination;
means coupled to said third combining means, for producing a coarse detail luminance motion indicating signal whenever said third combined difference samples exceed a predetermined magnitude.

12. The interimage motion detector set forth in claim 11 further including means responsive to said fine detail luminance motion indicating signal and said coarse detail luminance motion indicating signal for developing a luminance motion indicating signal whenever either of said fine or coarse delayed luminance motion indicating signals indicate motion.

13. The interimage motion detector set forth in claim 10 further including;
means coupled to said source for producing interimage sample sums of corresponding signals from two image periods, from frequency component of said composite video signal containing chrominance components to the substantial exclusion of other frequency components of composite video signal;
first means, coupled to the means for producing sample sums, for combining a plurality of sample sums selected from sample sums corresponding to image points occurring in said horizontal image line containing said image point under examination and a preceding horizontal image line, wherein alternate sample sums from a horizontal image line are combined in opposite polarity sense and one half of said plurality of sample sums are combined in a positive polarity sense and one half in a negative polarity sense to produce first combined samples sums;
second means, coupled to the means for producing sample sums, for combining a plurality of sample sums selected from sample sums corresponding to image points occurring in said horizontal image line containing said image point under examination and a succeeding horizontal image line, wherein alternate sample sums from a horizontal image line are combined in opposite polarity sense and one half of said plurality of sample sums are combined in a positive polarity sense and one half in a negative polarity sense to produce a second combined samples sums;

means coupled to said first and second means for combining sample sums, for producing a chrominance motion indicating signal whenever said first and second combined sample sums concurrently exceed a predetermined magnitude.

14. The interimage motion detector set forth in claim 13 further including means responsive to said chrominance motion indicating signal and said fine detail luminance motion signal for producing an image motion indicating signal whenever either said chrominance or luminance motion signals indicate motion.

15. The interimage motion detector set forth in claim 13 further including:

means coupled to said source for producing interimage difference samples from frequency components of said composite video signal representing coarse luminance image detail information;

a third combining means for combining a plurality of difference samples representing coarse luminance detail information to produce third combined difference samples, said plurality of difference samples representing coarse luminance detail information corresponding to image points proximate said image point under examination;

means coupled to said third combining means, for producing a coarse detail luminance motion indicating signal whenever said third combined difference samples exceed a predetermined magnitude; and means responsive to said fine detail luminance motion indicating signal and said coarse detail luminance motion indicating signal for developing a luminance motion indicating signal whenever either of said fine or coarse luminance motion indicating signals indicate motion.

16. A signal interimage motion detector comprising:

a source of video signal;

means coupled to said source for producing difference samples corresponding to differences between video signals from successive image periods;

first means, coupled to said means for producing difference samples, for combining a plurality of said difference samples, said plurality of difference samples including a difference sample corresponding to an image point currently under examination for interimage motion, and difference samples corresponding to image points proximate said image point under examination occurring in a horizontal image line containing said image point under examination and in a preceding horizontal image line to produce first combined difference samples;

second means, coupled to said means for producing difference samples, for combining a plurality of said difference samples, said plurality of difference samples including a difference sample corresponding to said image point under examination, and difference samples corresponding to image points proximate said image point under examination occurring in said horizontal image line containing said image point under examination and in a succeeding horizontal image line to produce a second combined difference samples;

means, coupled to said first and second combining means, for producing a motion signal whenever said first and second combined difference samples concurrently exceed a predetermined magnitude value.

* * * * *